(12) United States Patent
Oswald et al.

(10) Patent No.: US 12,428,967 B2
(45) Date of Patent: Sep. 30, 2025

(54) GUIDE VANE

(71) Applicant: ANDRITZ HYDRO GmbH, Vienna (AT)

(72) Inventors: Markus Oswald, Marchtrenk (AT); Rudolf Peyreder, Linz (AT); Simon Weissenberger, Ottensheim (AT)

(73) Assignee: ANDRITZ HYDRO GMBH, Vienna (AT)

( * ) Notice: Subject to any disclaimer, the term of this patent is extended or adjusted under 35 U.S.C. 154(b) by 0 days.

(21) Appl. No.: 18/838,094

(22) PCT Filed: Feb. 9, 2023

(86) PCT No.: PCT/AT2023/060037
§ 371 (c)(1),
(2) Date: Aug. 13, 2024

(87) PCT Pub. No.: WO2023/212757
PCT Pub. Date: Nov. 9, 2023

(65) Prior Publication Data
US 2025/0146420 A1    May 8, 2025

(30) Foreign Application Priority Data
May 3, 2022    (AT) .............................. A 50303/2022

(51) Int. Cl.
*F01D 9/04*    (2006.01)
(52) U.S. Cl.
CPC ............. *F01D 9/041* (2013.01); *F01D 9/042* (2013.01); *F05D 2230/00* (2013.01);
(Continued)
(58) Field of Classification Search
CPC ........ F03B 3/18; F03B 3/183; F05D 2210/43; F05D 2240/121; F05D 2240/123; F05D 2240/124
See application file for complete search history.

(56) References Cited

U.S. PATENT DOCUMENTS 1,607,773 A * 11/1926 Moody ................... F03B 3/04
 415/161
5,441,384 A * 8/1995 Gokhman ............... F03B 3/183
 415/164
2021/0285414 A1   9/2021 Lenarcic

FOREIGN PATENT DOCUMENTS

DE      458024     3/1928
EP     3 791 059   2/2022
(Continued)

OTHER PUBLICATIONS

Kawajiri et al., "Design Optimization Method for Francis Turbine", 2014, IOP Science, iopscience.iop.org (Year: 2014).*
(Continued)

*Primary Examiner* — Danielle M. Christensen
(74) *Attorney, Agent, or Firm* — GREENBLUM & BERNSTEIN, P.L.C.

(57) ABSTRACT

Guide vane for a guide wheel of a pump or turbine having a guide vane body with two end faces, a guide vane leading edge, a guide vane trailing edge, and first and second flow-guiding side faces connecting the vane leading and trailing edges and forming different flow profiles along an axial extension. Each flow profile has a chord, a mean camber line, and a mean camber curve end angle between the mean camber line and the chord at the vane trailing edge. The guide vane is mounted to rotate about an axis of rotation defined by two pivot pins. Along the axial extension, the guide vane has at least one flow profile with a positive mean camber curve end angle and at least one flow profile with a negative mean camber curve end angle. The guide vane leading edge is tilted relative to the axis of rotation.

23 Claims, 4 Drawing Sheets

(52) U.S. Cl.
    CPC .... *F05D 2240/12* (2013.01); *F05D 2240/121* (2013.01); *F05D 2240/122* (2013.01)

(56) References Cited

FOREIGN PATENT DOCUMENTS

| | | |
|---|---|---|
| FR | 372975 | 4/1907 |
| WO | 95/10705 | 4/1995 |

OTHER PUBLICATIONS

Int'l Search Report (SR) (Form PCT/ISA/210) conducted in Int'l Appln. No. PCT/AT2023/060037 (May 4, 2023).
Int'l Written Opinion (WO) (Form PCT/ISA/237) conducted in Int'l Appln. No. PCT/AT2023/060037 (May 4, 2023).
Int'l Prelim. Report (IPER (Form PCT/IPEA/409) conducted in Int'l Appln. No. PCT/AT2023/060037 (May 1, 2024).

\* cited by examiner

GUIDE VANE

The invention relates to a guide vane for a guide wheel of a pump or turbine, comprising a guide vane body having two end faces, a guide vane leading edge, a guide vane trailing edge, as well as a first flow-guiding side face and a second flow-guiding side face which connect the guide vane leading edge and the guide vane trailing edge and form different flow profiles along an axial extension, each of which flow profiles has a chord, a mean camber line, and a mean camber curve end angle at which the mean camber line is positioned to the chord at the guide vane trailing edge, wherein the guide vane can be mounted such that it can rotate about an axis of rotation which, in particular, is defined by two pivot pins.

Furthermore, the invention relates to a method for designing a hydroelectric power system, in particular a pump or turbine, having a guide wheel which comprises guide vanes, in particular a Kaplan or Francis turbine, wherein by the varying of design parameters, variants are formed and flow conditions that can be achieved by implementing the individual variants are determined, in particular by means of flow simulations or by tests, whereupon, depending on flow conditions that can be achieved, one of the variants is selected, in particular the variant with which an efficiency optimum is obtained.

Guide vanes have become known from the prior art, in particular for guiding a working medium onto rotor blades of a runner at an optimal angle in turbines. In contrast to the rotor blades that can be rotated with the runner, the guide vanes are, as a rule, arranged to be stationary, but can be rotated about the axis of rotation in an inlet housing in order to influence a flow and, if necessary, prevent a mass flow. For this purpose, for example in Kaplan or Francis turbines, the guide vanes can be arranged in the inlet housing at regular intervals along a circle coaxial with the runner, whereby what is referred to as a guide apparatus results, which is also called a guide ring.

In hydroelectric power plants, an obtainable efficiency is of high importance, which is why, when a hydroelectric power plant is being designed, variants are normally first formed by the variation of typical design parameters and then, through an analysis of the flow properties of the individual variants, it is determined which of the variants can be used to obtain the best results, in particular an optimal efficiency. For this purpose, computer-implemented flow simulations are typically used.

In this manner, different design parameters have become known from the prior art which are varied to form variations and which thus span a solution space in which an optimal solution is sought in that individual variants are computationally and/or empirically explored. In the case of a guide vane, design parameters can, for example, be the mean camber curve end angle, a profile thickness, and a progression or a curvature of the mean camber line, which can result in a plurality of possible variants.

From the document EP 3 791 059 B1, for example, a guide wheel for a pump turbine has become known, in which guide wheel the flow profile in the middle region of the guide vane has a larger guide vane angle than a flow profile in the peripheral region of the guide vane.

It has been shown, however, that in many cases merely unsatisfactory results are obtained by solely varying design parameters known from the prior art.

This is addressed by the invention. The object of the invention is to specify a guide vane of the type named at the outset with which a flow in a hydroelectric power plant can be influenced such that an improved efficiency is obtainable.

Furthermore, a method of the type named at the outset is to be specified with which an improved design of a hydroelectric power system is possible, in particular to obtain a hydroelectric power system with a higher efficiency.

According to the invention, the first object is attained with a guide vane of the type named at the outset which, along the axial extension, has at least one flow profile with a positive mean camber curve end angle and at least one flow profile with a negative mean camber curve end angle.

In the course of the invention, it was found that, by a varying of the mean camber curve end angle from a positive mean camber curve end angle, for example in a bottom region of the guide vane, to a negative mean camber curve end angle, for example in a top region of the guide vane, a beneficial influence of the flow is possible, with which an increased efficiency can be obtained. Such a deformation of the profile along a length or an axial extension of the vane by changing the mean camber curve end angle is also referred to as a profiled strake. Accordingly, a corresponding guide vane can also be referred to as guide vane with a strake.

An axial extension is in this case considered to be an extension along the axis of rotation about which the guide vane can be rotatably mounted.

A guide vane leading edge is considered to be the edge or the end of the guide vane which a flow strikes first during a turbine operation.

It shall be understood that a guide vane leading edge and guide vane trailing edge are not necessarily to be understood as edges in a geometric sense, but rather can also be formed by correspondingly curved faces, for example, so that the guide vane trailing edge can actually be a guide vane trailing face, for example.

In other words, through the possibility of altering the position of the mean camber line relative to the chord along the axial extension of the guide vane such that the mean camber curve end angle changes from positive to negative, there results an additional design parameter with which the solution space is enlarged. It has been shown that, in many cases, a higher efficiency is thus obtainable.

The terms bottom and top can thereby refer to an intended use of the guide vane in a hydroelectric power system with a vertical axis, so that the bottom region is typically closer to the runner than the top region of the guide vane.

It has thus been shown that, in these hydroelectric power systems, a flow at the guide vanes is very different across a height, particularly since the flow in some regions is accelerated due to the geometry. Through the use of a straked guide vane with a mean camber curve end angle which changes from positive to negative, or from negative to positive, along the height, which in this case is also referred to as an axial extension or an extension along the axis of rotation, this inhomogeneity of the flow can be accounted for particularly well, whereby an improved inflow to the runner can be obtained, losses can be minimized, and an efficiency can be improved.

It shall be understood that the guide vanes can, of course, also be used in a hydroelectric power system with a horizontal axis. In this case, bottom is to be interpreted as being close to the runner and top as distant from the runner. In the guide apparatus, the guide vanes are typically roughly arranged along a circle and are uniformly distributed along the circumference, which is coaxial with the runner, and rotatably mounted via pivot pins, although other arrangements are in principle also possible. In many cases, the axes of rotation of the individual guide vanes are roughly parallel in the guide apparatus. The guide vanes according to the invention can also be used in tubular turbines, wherein axes of rotation of the individual guide vanes are typically not parallel.

The guide vanes according to the invention can also be used in tubular turbines, wherein the axes of rotation of the guide vanes are not parallel to the axis of the hydroelectric power system. In this case, the terms bottom and top are to be interpreted as radially inside and radially outside in the intended arrangement in the guide apparatus, so that a bottom region of a guide vane is closer to the axis of the tubular turbine than a top region.

Furthermore, guide vanes according to the invention can, of course, also be used in Deriaz turbines or diagonal turbines.

Flow profiles are understood as imaginary sections through the guide vane perpendicular to an axis of rotation about which the guide vane can be or is rotatably mounted. The axis of rotation can coincide with a longitudinal axis of the guide vane and is typically defined by pivot pins which are affixed to the side faces of the guide vanes and correspond to corresponding bearing locations in the inlet housing.

A mean camber line denotes a connecting line of the centers of circles inscribed in a profile. Accordingly, the mean camber line is equidistant to the flow-guiding side faces at every position and connects the guide vane leading edge to the guide vane trailing edge.

A chord denotes a straight connecting line of the guide vane leading edge and guide vane trailing edge.

Here, a positive mean camber curve end angle is considered to be an angle, measured in the counterclockwise direction, from the mean camber line to the chord when viewed from a top end face of the guide vane in the direction of the bottom end face, that is, in plan view, if the chord is spaced less far away from the mean camber line in the counterclockwise direction than in the clockwise direction. In a corresponding arrangement of the guide vane, such that the guide vane leading edge is positioned on the left-hand side and the guide vane trailing edge on the right-hand side, a mean camber line arranged above the chord in the region of the guide vane trailing edge in plan view thus results in a positive mean camber curve end angle, and a mean camber line arranged below the chord results in a negative mean camber curve end angle.

The effects, according to the invention, of an increased efficiency due to the mean camber curve end angle changing from positive to negative or, depending on a direction of rotation of the runner, also from negative to positive along the axial extension are, in principle, independent of a specific angle and are also already achieved with very small angles.

However, it has proven particularly beneficial if the guide vane has a flow profile with a mean camber curve end angle of more than 2 degrees, in particular 5 degrees to 20 degrees. It has been shown that specifically this range often leads especially favorable efficiencies for hydroelectric power plants.

Furthermore, it has proven advantages if the guide vane has a flow profile with a mean camber curve end angle of less than minus 2 degrees, in particular minus 5 degrees to minus 20 degrees.

Particularly a guide vane which has a profile with a mean camber curve end angle of minus 5 degrees to minus 20 degrees in one region, for example a top peripheral region, and a profile with a mean camber curve end angle of 5 degrees to 20 degrees in another region, in particular a bottom peripheral region, has proven beneficial for obtaining advantageous flow conditions.

For flow profiles, a profile thickness is dependent on the mean camber line and is typically larger close to the guide vane leading edge than in a region of the guide vane trailing edge. In a guide vane according to the invention, the profile thickness can essentially be independent of the axial extension, for example can vary by less than 20% along the axial extension. In a particularly simple case, the guide vane can thus, for example, have in a top region a flow profile curved upwards or a mean camber line with positive curvature and in a bottom region the corresponding profile, for example a flow profile similar to a NACA profile, which is curved downwards or has a negatively curved mean camber line, so that the profile thickness is only dependent on a position on the mean camber line, but independent of the axial position. Alternatively, it is of course also possible that the profile thickness varies along the axial position, and that a bottom region of the guide vane has, for example, larger profile thicknesses at the same positions relative to the mean camber line.

It can also be provided, for example, that a flow profile in a bottom region of the guide vane corresponds to a flow profile in a top region of the guide vane, which flow profile is mirrored over a chord plane.

Through the new design parameter, described herein, of a mean camber line that changes position relative to the chord, it is also possible to form guide vanes in which the position of the mean camber line relative to the chord switches sides multiple times along the axial extension, that is, the mean camber curve end angle changes multiple times from positive to negative or from negative to positive. However, especially for the use in a hydroelectric power system, it is preferably provided that the mean camber curve end angle switches signs exactly once along an axial extension of the guide vane, wherein in particular the mean camber curve end angle is negative in a region of the guide vane that is at the top during intended use, and is positive in a region that is at the bottom during intended use. As a result, flow conditions in the intake to a runner can be influenced particularly well in a manner which helps to reduce losses.

It is preferably provided that the mean camber curve end angle changes by more than 5 degrees, in particular by 10 degrees to 40 degrees, along an axial extension of the guide vane. The flow is thus favorably influenced and, at the same time, undesired breakaways are avoided.

It is beneficial if, along an axial extension, the guide vane has at least one profile with a positively curved mean camber line and at least one profile with a negatively curved mean camber line.

Between the positively curved mean camber line and the negatively curved mean camber line, the guide vane can also comprise a straight region, in which the mean camber line can coincide with the chord.

It can be provided that the guide vane leading edge is, at least in regions, tilted or skewed relative to the axis of rotation. A guide vane with profiles skewed about a guide apparatus center is also referred to as leaned. In the case of cylindrical guide apparatuses, this corresponds to a skewing about the turbine axis. It has now been shown that a guide vane that is not only tilted or skewed relative to the axis of rotation, but also is additionally straked, can result in particularly favorable flow conditions in order to minimize losses between the guide wheel and runner.

The guide vane can thus be embodied such that, at least in regions, preferably over an entire height of the guide vane, a spacing of the guide vane leading edge from the axis of rotation continuously decreases or increases as the axial extension of the guide vane increases.

It can also be provided that the guide vane trailing edge is, at least in regions, tilted relative to the axis of rotation. In this case, it is preferably provided that, at least in regions, preferably over an entire height of the guide vane, a spacing of the guide vane trailing edge from the axis of rotation continuously decreases or continuously increases as the axial extension of the guide vane increases.

It is particularly beneficial if the guide vane comprises a closing edge corresponding to a side face, so that a closing edge of a guide vane can touch a side face of a guide vane arranged adjacently thereto in a closed state of the guide vane, in order to be able to shut off a flow entirely if necessary. Normally, the closing edge is arranged in the region of the guide vane trailing edge and, close to the guide vane trailing edge (usually a top side of the trailing edge), said closing edge meets the side face of the other guide vane arranged adjacently thereto close to the guide vane leading edge, in order to produce the closed state.

In principle, the closing edge can also be formed by the guide vane trailing edge. It can also be provided that, in a closed state, the first flow-guiding side face of one guide vane and the second flow-guiding side face of a second guide vane arranged adjacently thereto touch in order to obtain a closed or impermeable state. In this case, the closing edge is formed by a contact line or a contact area of the side faces.

A corresponding guide vane is preferably used within the scope of a guide wheel for a pump or turbine, in particular for a Kaplan or Francis turbine, or also a tubular turbine. Accordingly, it is beneficial if, in the case of a guide wheel for a pump or turbine, in particular for a Kaplan or Francis turbine, which guide wheel is formed by multiple guide vanes, the guide vanes are embodied according to the invention.

The guide vane is typically formed from a metal, normally in a solid manner, and can, for example, be produced by milling or a sheet metal construction.

With a guide wheel embodied according to the invention, a positive influencing of a flow is basically possible independent of a size. However, it is particularly preferred if it is provided that a corresponding guide wheel has a diameter of more than 2 m. The diameter of the guide wheel can be measured at the pivot pins of the guide vanes, for example. In this case, the diameter is also referred to as the pin circle diameter. It has been shown that, with machines of this scale, the effects according to the invention can be utilized particularly well.

Accordingly, the guide vane typically has a length along the axis of rotation of 0.5 m to 10 m, and a spacing of the guide vane leading edge from the guide vane trailing edge can be approximately 15 cm to 3.0 m, for example.

The other object is attained according to the invention with a method of the type named at the outset in which at least one variant comprises a guide wheel embodied according to the invention.

Through the associated enlargement of the solution space, possible solutions for the design are taken into account that are not explored in conventional methods, so that by enlarging the solution space to include variants with straked guide vanes which have mean camber lines that switch across the chord, better results can be obtained in many cases.

It shall be understood that, in a further step, the correspondingly designed hydroelectric power system is typically produced in accordance with the identified design, in order to be able to then actually achieve the computationally and/or empirically determined higher efficiency during operation of the hydroelectric power system.

Additional features, advantages, and effects of the invention follow from the exemplary embodiment described below. In the drawings which are thereby referenced:

Figure 1:
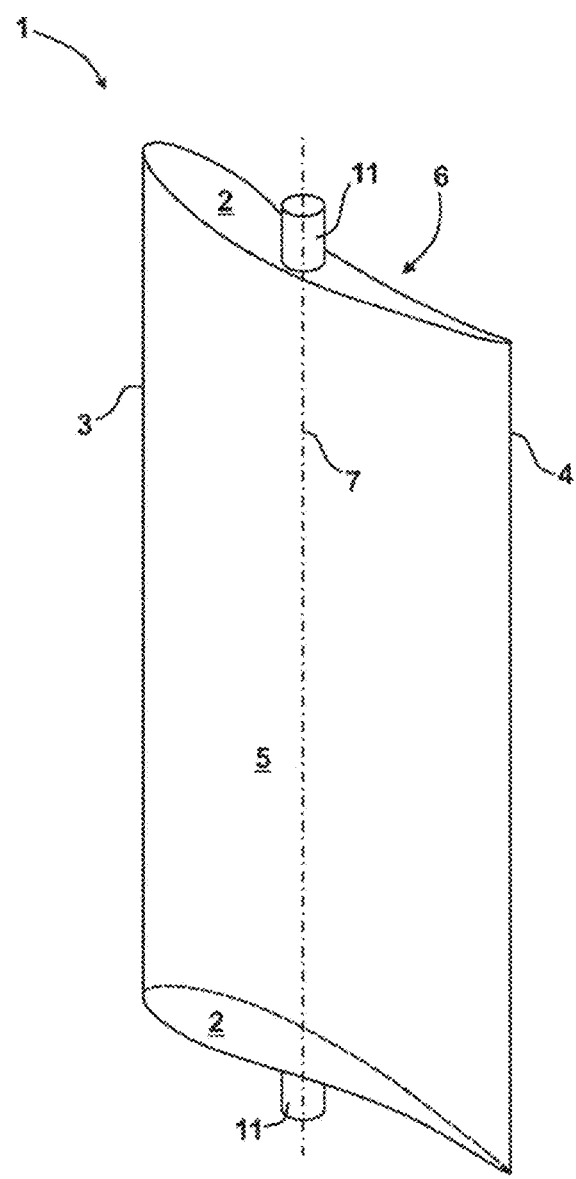
FIGS. 1 and 2 show a guide vane according to the invention in different views.
Figure 2:
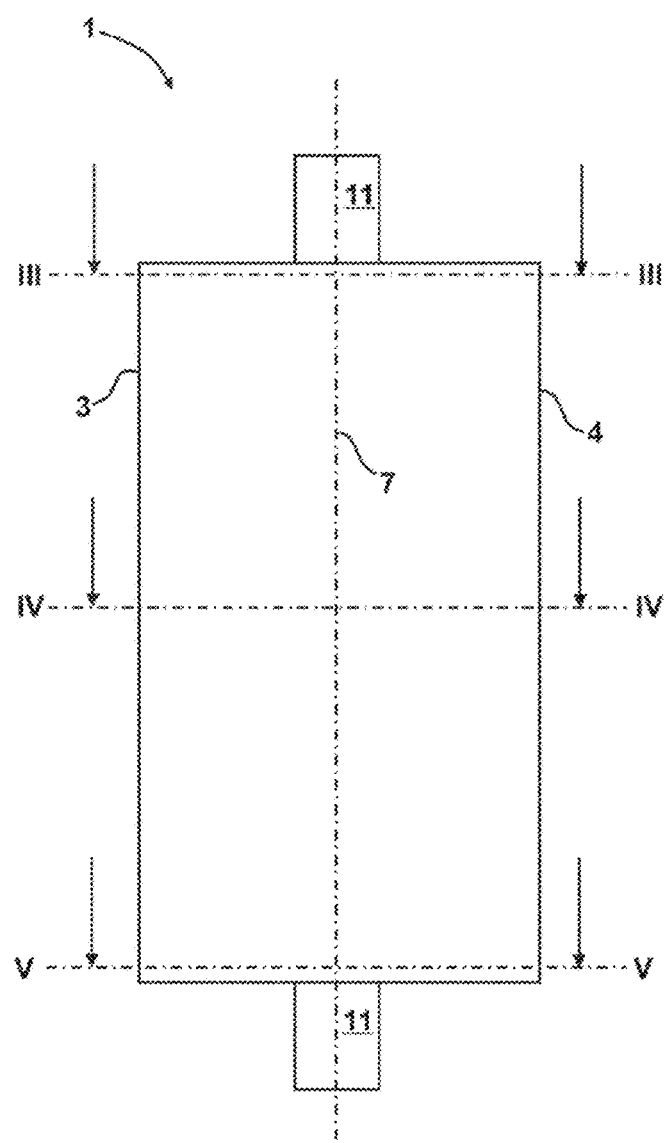

FIGS. 1 and 2 show a guide vane 1 according to the invention, wherein FIG. 1 shows the guide vane 1 in a 3D view and FIG. 2 shows the guide vane 1 in a side view. As illustrated, the guide vane 1 comprises a guide vane leading edge 3 and a guide vane trailing edge 4, which are connected by a first flow-guiding side face 5 and a second flow-guiding side face 6, which side faces 5, 6 are bounded at an end side by end faces 2.

The guide vane 1 is embodied with pivot pins 11 at the end faces 2 for the rotatable arrangement in an inlet housing, which pivot pins 11 define an axis of rotation 7 about which the guide vane 1 can be rotatably mounted.

The flow-guiding side faces 5, 6 form flow profiles 12 in sections perpendicular to the axis of rotation 7, wherein the guide vane 1 has different profiles along the axis of rotation 7, or along an axial extension along the axis of rotation 7, as can already be seen in FIG. 1.

FIGS. 1 and 2 respectively show the guide vane 1 in an intended arrangement for a hydroelectric power system with a vertical axis, so that regions depicted at the top in FIGS. 1 and 2 are also at the top during use in the hydroelectric power system, and are therefore typically spaced farther from the runner than bottom regions.

Figure 3:
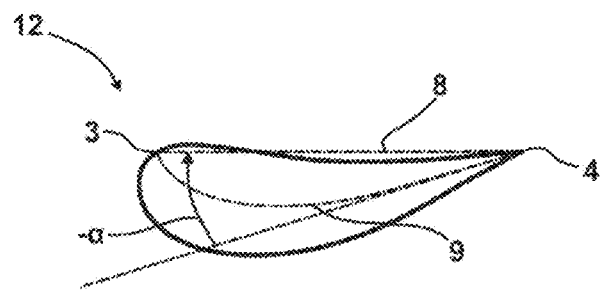
FIGS. 3 through 5 show flow profiles of the guide vane illustrated in FIGS. 1 and 2.
Figure 4:
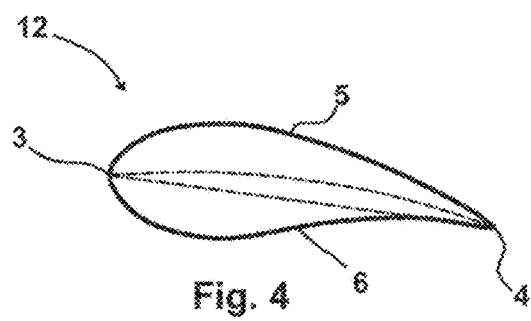
Figure 5:
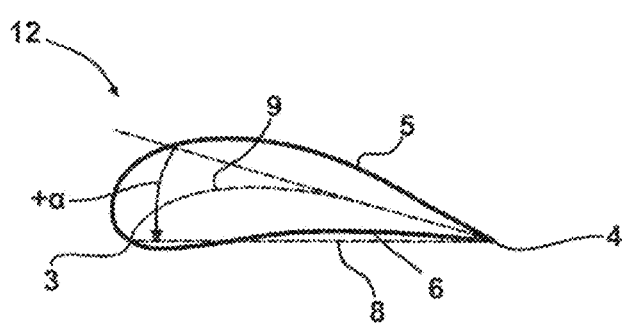

FIG. 3 shows a plan view of a section through the guide vane 1 along the line III-III in FIG. 2, FIG. 4 shows a section through the guide vane 1 from FIG. 2 along the line IV-IV, and FIG. 5 shows a section along the line V-V in FIG. 2, in plan view in each case.

The sections illustrated in FIG. 3 through FIG. 5 thus show flow profiles 12 at different height positions, or at different positions along the axis of rotation 7. Each flow profile 12 thereby has, analogously to the guide vane 1, a guide vane leading edge 3 and a guide vane trailing edge 4 that are connected by the flow-guiding side faces 5, 6. Furthermore, each flow profile 12 has a chord 8 and a mean camber line 9, wherein the chord 8 is defined by a straight connecting line between the guide vane leading edge 3 and the guide vane trailing edge 4. The mean camber line 9, which is also referred to as the profile center line, camber line, or curvature line, is defined by the connecting line of the centers of circles inscribed in a profile.

At the guide vane trailing edge 4, the mean camber line 9 is positioned at a mean camber curve end angle $\alpha$, measured in the counterclockwise direction in the depicted plan views, to the chord 8, whereby a breakaway behavior of the guide vane 1 is essentially determined in this region. The mean camber curve end angle $\alpha$ is therefore depicted on a tangent to the mean camber line 9 at the guide vane trailing edge 4.

As can be seen in FIGS. 3 through 5, the mean camber line 9 changes its position relative to the chord from below the chord 8 in a top region to above the chord 8 in a bottom region. As a result, the mean camber curve end angle $\alpha$ changes from a highly negative mean camber curve end angle $-\alpha$ in the top region illustrated in FIG. 3 to a slightly positive mean camber curve end angle $+\alpha$ in the center region illustrated in FIG. 4, to a highly positive mean camber curve end angle +α in the bottom region illustrated in FIG. 5. The use of different flow profiles over the axial extension results in a profiled strake. It is then possible, for example, to achieve a targeted higher swirl of the flow in a top region, whereby the flow after the guide vanes 1 is influenced in a manner that is beneficial to the downstream runner, so that losses can be reduced and an efficiency can be increased.

In the exemplary embodiment illustrated, the mean camber curve end angle α in the flow profile 12 illustrated in FIG. 3 in the top region of the guide vane 1 is approximately minus 15 degrees and in the bottom flow profile 12 illustrated in FIG. 5 is approximately plus 15 degrees, so that there is a skewing or a strake of approximately 30 degrees from the top region to the bottom region.

As can be seen, the flow profiles 12 of the guide vane 1 that are illustrated in FIG. 3 through FIG. 5 have essentially similar profile thicknesses along the mean camber line 9, so that the flow profile 12 illustrated in FIG. 5 approximately constitutes a mirroring of the profile illustrated in FIG. 3 over a horizontal axis. In principle, however, flow profiles 12 with varying profile thicknesses are also possible.

Figure 6:
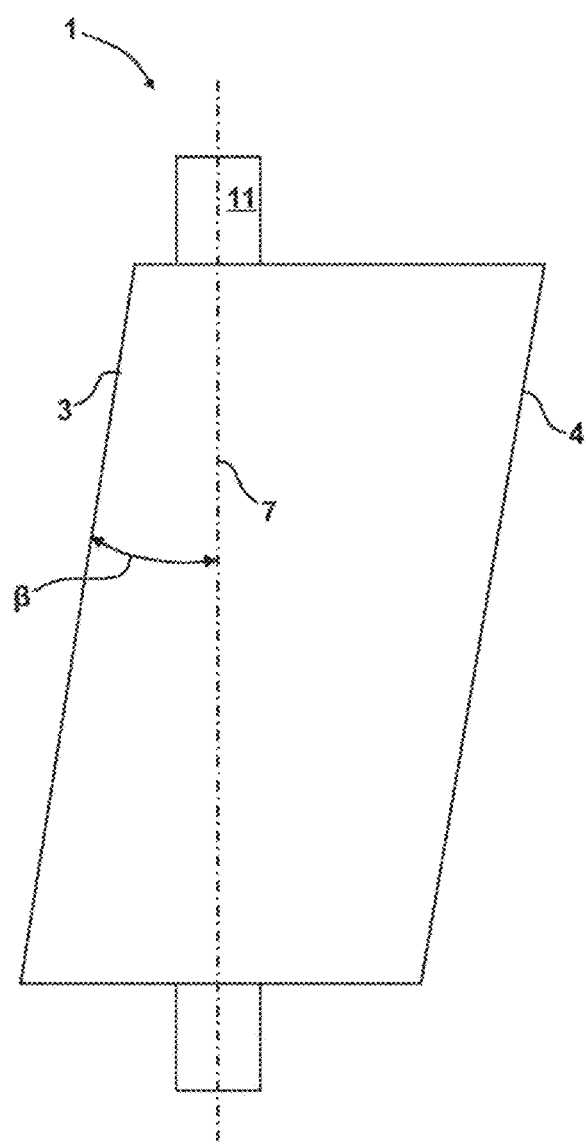
FIG. 6 shows a further guide vane.

FIG. 6 shows a further guide vane 1 which has, in a distributed manner along an axial extension along the axis of rotation 7 or over a height, flow profiles 12 analogous to the flow profiles 12 illustrated in FIGS. 3 through 5, so that this guide vane 1 is also a straked guide vane 1. Additionally, however, this guide vane 1 also has a guide vane leading edge 3 tilted relative to the axis of rotation 7 and a tilted guide vane trailing edge 4, which is why a guide vane 1 of this type can also be referred to as leaned.

The guide vane leading edge 3 and the guide vane trailing edge 4 thereby have a tilt angle β relative to the axis of rotation 7 of 16 degrees, for example, wherein as illustrated in FIG. 6, the guide vane leading edge 3 and the guide vane trailing edge 4 can be tilted over an entire length. Alternatively, it could also be provided that the guide vane leading edge 3 and/or the guide vane trailing edge 4 run in a tilted manner over only a partial region, or only one of said edges is tilted.

It has been shown that, in some cases, a particularly good efficiency can be achieved with a guide vane 1 that is not only straked, but also leaned.

A guide vane 1 according to the invention is typically used within the scope of a guide wheel or a guide apparatus in combination with multiple identically embodied other guide vanes 1 that are arranged at regular intervals along a circle and are rotatably mounted in the inlet housing via the pivot pins 11, wherein the individual guide vanes 1 can be simultaneously actuated in order to be able to influence a flow to a downstream runner and, if necessary, shut off said flow.

For this purpose, the guide vanes 1 typically comprise in the region of the guide vane trailing edge 4 a closing edge that corresponds to the side face, so that, in a closed state, two guide vanes arranged adjacently to one another touch essentially continuously along the axial extension via the closing edge and the side face, and thus seal the runner against an inflow.

With a guide wheel embodied according to the invention, losses in hydroelectric power systems can be reduced so that higher efficiencies can be obtained. By integrating the corresponding design parameter into a method for designing a hydroelectric power system such as a pump or turbine, for example, the solution space can thus be expanded to include promising variants, so that, using a method according to the invention, better hydroelectric power systems can in many cases be designed and subsequently produced. For this purpose, variants having guide wheels embodied according to the invention are also taken into consideration during the variant formation, whereupon flow situations, in particular flow velocities between the guide wheel and the runner of a corresponding hydroelectric power system, are calculated and losses are analyzed based on said calculations, after which the variant with which the best results are obtained, in particular the variant with which a maximum efficiency is achieved, is selected as the design for the hydroelectric power system. The corresponding hydroelectric power system is then produced using customary methods in accordance with the identified design.

The invention claimed is:

1. A guide vane for a guide wheel of a pump or turbine, comprising:
    a guide vane body having two end faces, a guide vane leading edge, a guide vane trailing edge, and a first flow-guiding side face and a second flow-guiding side face, which connect the guide vane leading edge and the guide vane trailing edge and form different flow profiles along an axial extension; and
    each of the flow profiles has a chord, a mean camber line, and a mean camber curve end angle at which the mean camber line is positioned to the chord at the guide vane trailing edge,
    wherein the guide vane is mountable for rotation about an axis of rotation,
    wherein, along the axial extension, the guide vane has at least one flow profile with a positive mean camber curve end angle and at least one flow profile with a negative mean camber curve end angle, and
    wherein the guide vane leading edge is tilted relative to the axis of rotation.

2. The guide vane according to claim 1, wherein the guide vane has a flow profile with a mean camber curve end angle of more than 2 degrees.

3. The guide vane according to claim 2, wherein the mean camber curve end angle of the flow profile is 5 degrees to 20 degrees.

4. The guide vane according to claim 1, wherein the guide vane has a flow profile with a mean camber curve end angle of less than minus 2 degrees.

5. The guide vane according to claim 4, wherein the mean camber curve end angle of the flow profile is 5 degrees to minus 20 degrees.

6. The guide vane according to claim 1, wherein the mean camber curve end angle switches signs exactly once along an axial extension of the guide vane.

7. The guide vane according to claim 6, wherein the mean camber curve end angle is negative in a region of the guide vane that is at the top during intended use, and is positive in a region that is at the bottom during intended use.

8. The guide vane according to claim 1, wherein the mean camber curve end angle changes by more than 5 degrees along an axial extension of the guide vane.

9. The guide vane according to claim 8, wherein the mean camber curve end angle changes by 10 degrees to 40 degrees along the axial extension of the guide vane.

10. The guide vane according to claim 1, wherein, along an axial extension, the guide vane has at least one profile with a positively curved mean camber line and at least one profile with a negatively curved mean camber line.

11. The guide vane according to claim 1, wherein the guide vane leading edge is tilted relative to the axis of rotation, by a tilt angle of 1 degree to 20 degrees.

12. The guide vane according to claim 1, wherein the guide vane trailing edge is tilted relative to the axis of rotation, by a tilt angle of 1 degree to 20 degrees.

13. The guide vane according to claim 1, wherein the guide vane comprises a closing edge corresponding to a side face, so that a closing edge of a guide vane can touch a side face of a guide vane arranged adjacently thereto in a closed state of the guide vanes.

14. A guide wheel for a pump or turbine, comprising:
   multiple guide vanes, wherein the guide vanes are embodied according to claim 1.

15. The guide wheel according to claim 14, wherein the guide wheel has a diameter of more than 2 m.

16. A method for designing a hydroelectric power system having a guide wheel which comprises guide vanes comprising:
   varying design parameters to form different variants and determining flow conditions achievable by implementing individual variants,
   whereupon, depending on the determined achievable flow conditions, one of the individual variants is selected, and
   wherein at least one of the individual variants comprises a guide wheel which is embodied according to claim 14.

17. A method for producing a hydroelectric power system, wherein the hydroelectric power system is produced in accordance with a design determined using the method according to claim 16.

18. The method according to claim 16, wherein the hydroelectric power system comprises a pump or turbine.

19. The method according to claim 16, wherein the turbine comprises a Kaplan or Francis turbine.

20. The method according to claim 16, wherein the flow conditions are determined by flow simulation or by tests.

21. The method according to claim 16, wherein the selected one of the individual variants obtains an efficiency optimum.

22. The guide wheel according to claim 14, wherein the turbine comprises a Kaplan or Francis turbine.

23. The guide vane according to claim 1, wherein the axis of rotation about which the guide vane is rotatable is defined by two pivot pins.

* * * * *